(12) United States Patent
Chen

(10) Patent No.: US 7,864,551 B2
(45) Date of Patent: Jan. 4, 2011

(54) POWER SUPPLY DEVICE WITH SYSTEM SWITCH CIRCUIT

(75) Inventor: Yun-Chen Chen, Taipei Hsien (TW)

(73) Assignee: Zippy Technology Corp., Taipei Hsien (TW)

(*) Notice: Subject to any disclaimer, the term of this patent is extended or adjusted under 35 U.S.C. 154(b) by 421 days.

(21) Appl. No.: 12/143,437

(22) Filed: Jun. 20, 2008

(65) Prior Publication Data

US 2009/0316450 A1 Dec. 24, 2009

(51) Int. Cl.
*H02M 1/00* (2007.01)
(52) U.S. Cl. .............................. 363/49; 307/66; 318/432
(58) Field of Classification Search .................. 307/64, 307/66, 87, 147, 48; 363/13, 21.01, 21.12, 363/21.17, 49, 55, 56.01; 318/375, 380, 318/432, 456, 801, 599
See application file for complete search history.

(56) References Cited

U.S. PATENT DOCUMENTS

| 4,536,126 | A | * | 8/1985 | Reuther | 290/40 R |
| 4,746,854 | A | * | 5/1988 | Baker et al. | 320/130 |
| 5,229,651 | A | * | 7/1993 | Baxter et al. | 307/66 |
| 5,602,462 | A | * | 2/1997 | Stich et al. | 323/258 |
| 7,199,989 | B2 | * | 4/2007 | Itagaki et al. | 361/78 |

* cited by examiner

*Primary Examiner*—Rajnikant B Patel
(74) *Attorney, Agent, or Firm*—Muncy, Geissler, Olds & Lowe, PLLC

(57) ABSTRACT

A power supply device with a system switch circuit includes a primary power system, a stationary power system and a power management unit. The power management unit is triggered by a remote ON/OFF signal to generate a bias voltage power for turning on the primary power system after obtaining a stationary power. The system switch circuit is triggered by the remote ON/OFF signal to interrupt the stationary power system from obtaining an electric power path of an input power or a reference frequency signal to interrupt the stationary power, and triggered by the remote ON/OFF signal again to conduct the stationary power system to obtain the electric power path of the input power or the reference frequency signal to generate the stationary power, so as to achieve the effects of reducing a power loss as well as maintaining a normal operation of the power supply device.

9 Claims, 4 Drawing Sheets

POWER SUPPLY DEVICE WITH SYSTEM SWITCH CIRCUIT

FIELD OF THE INVENTION

The present invention relates to a power supply device with a system switch circuit, and more particularly to a power supply device capable of selecting an output circuit of a stationary power source.

BACKGROUND OF THE INVENTION

After computer motherboards are changed from the AT specification to the ATX specification, the architecture of a power supply device for supplying electric power is also changed, particularly the output of the power supply device is divided into a primary output power and a stationary power supplied by a primary power system and a stationary power system in the power supply device respectively, wherein the stationary power system is turned on after an input power is obtained by the input power source, the input power is converted into the stationary power to normally provide a sleep mode for the stationary power to achieve the remote ON function required by the ATX specification. If a user presses an ON button or turns on the computer by a remote control, the stationary power will be supplied as an electric power for turning on the primary power system, and thus the primary power system will generate a primary output power for the operations of an electronic device. In FIG. 1, a conventional power supply device includes a filter-rectifier unit 1, a power factor correction unit 2, a primary power system 3 and a stationary power system 4. The filter-rectifier unit 1 is provided for filtering and rectifying an obtained input power 91, boosting the voltage by the power factor correction unit 2 and adjusting the phase. The primary power system 3 further includes a primary pulse control unit 31 and a primary power conversion unit 32. The primary pulse control unit 31 cannot operate without a bias voltage power. In other words, the primary power system 3 cannot output power normally. On the other hand, the stationary power system 4 includes a stationary pulse control unit 41 and a stationary power conversion unit 42, and the stationary pulse control unit 41 obtains a reference frequency signal 95 and the input power 91 to drive the stationary power conversion unit 42 according to the reference frequency to convert and generate a stationary power 93 to be outputted to an output terminal 97. The stationary power system 4 generates a first standby signal to a power management unit 5. After a remote ON/OFF signal 94 triggers the power management unit 5, the power management unit 5 outputs the bias voltage power to turn on the primary pulse control unit 31, and the primary power system 3 starts working and provides a primary output power 92 to another output terminal 97. However, after the primary power system 3 is turned on, the stationary power system 4 remains working, and a pulse control and a transformer circuit used by the primary power system 3 and the stationary power system 4 for converting electric power are independent devices. Therefore, the primary power system 3 and the stationary power system 4 of the power supply device will have a power loss, and thus causing adverse effects of poor input/output conversion efficiency and excessive waste heat. The aforementioned two adverse effects will incur a higher design cost and a shorter life of the power supply device. If the stationary power system 4 is used normally for the power supply device as usual, the power loss issue of the conventional primary power system 3 and stationary power system 4 definitely requires improvements.

SUMMARY OF THE INVENTION

In view of the foregoing shortcomings of the prior art that the stationary power system of the power supply device will remain working and cause additional power loss after the primary power system works normally, the inventor of the present invention developed a power supply device with a system switch circuit in accordance with the present invention to overcome the shortcomings of the prior art.

The primary objective of the present invention is to provide a power supply device with system switch circuit, and the power supply device comprises a primary power system, a stationary power system and a power management unit, and after the power management unit is triggered by a remote ON/OFF signal and turned on by a stationary power, a bias voltage power is generated to start operating the primary power system, and the system switch circuit is triggered by the remote ON/OFF signal to interrupt the stationary power system from obtaining an electric power path of the input power or the reference frequency signal to interrupt the stationary power, and the remote ON/OFF signal is triggered again to conduct the stationary power system to obtain the electric power path of the input power or the reference frequency signal to generate the stationary power, such that the primary power system can turn off the stationary power system when the primary power system is powered on to reduce the power loss. After the primary power system is turned off and then turned on to resume the standby mode of the stationary power system, a normal operation of the power supply device can be achieved to reduce the power loss.

DETAILED DESCRIPTION OF THE PREFERRED EMBODIMENTS

The technical contents of the present invention will now be described in more detail hereinafter with reference to the accompanying drawings that show various embodiments of the invention.

Figure 1:
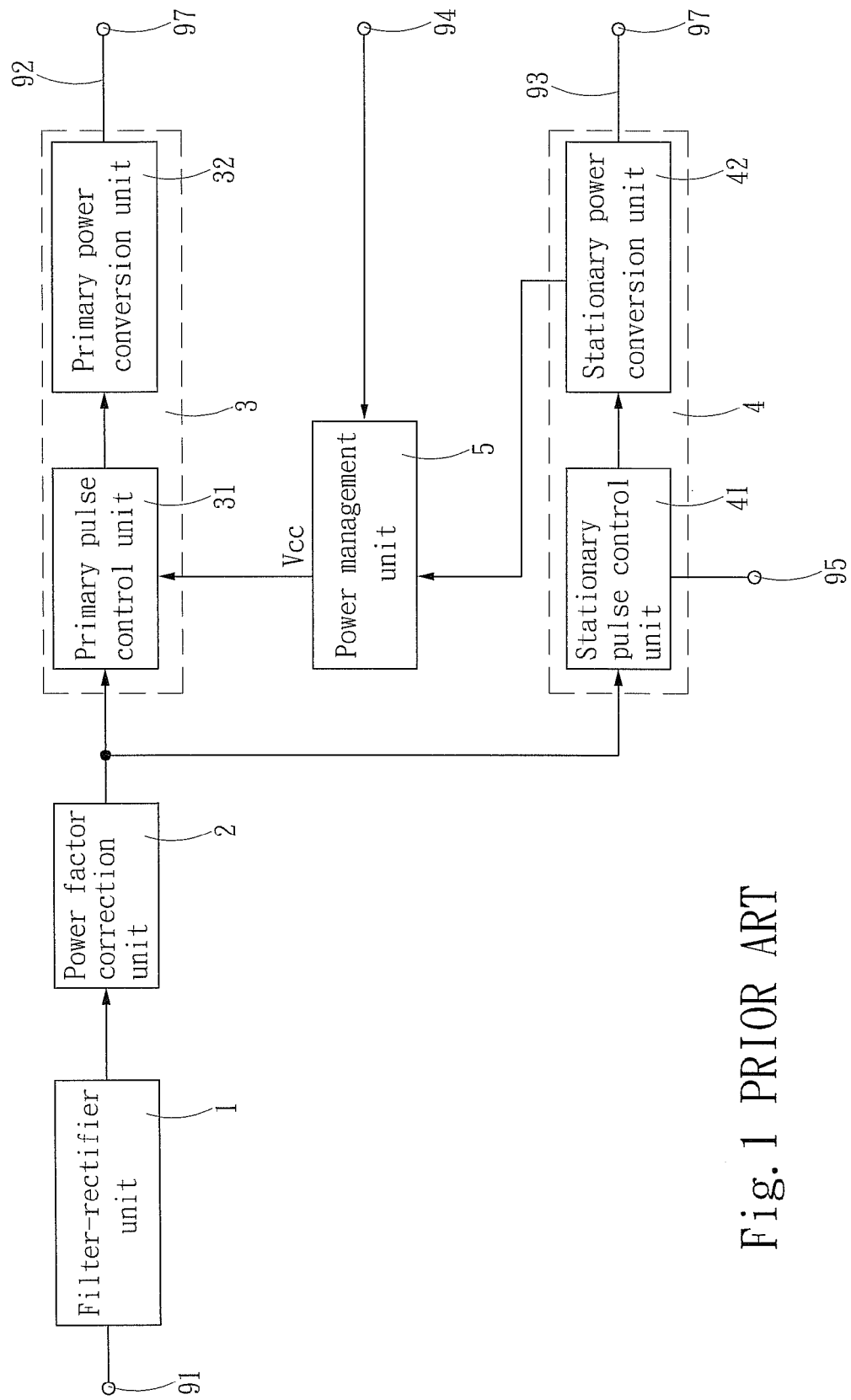
FIG. 1 is circuit block diagram of a conventional power supply device.
Figure 2:
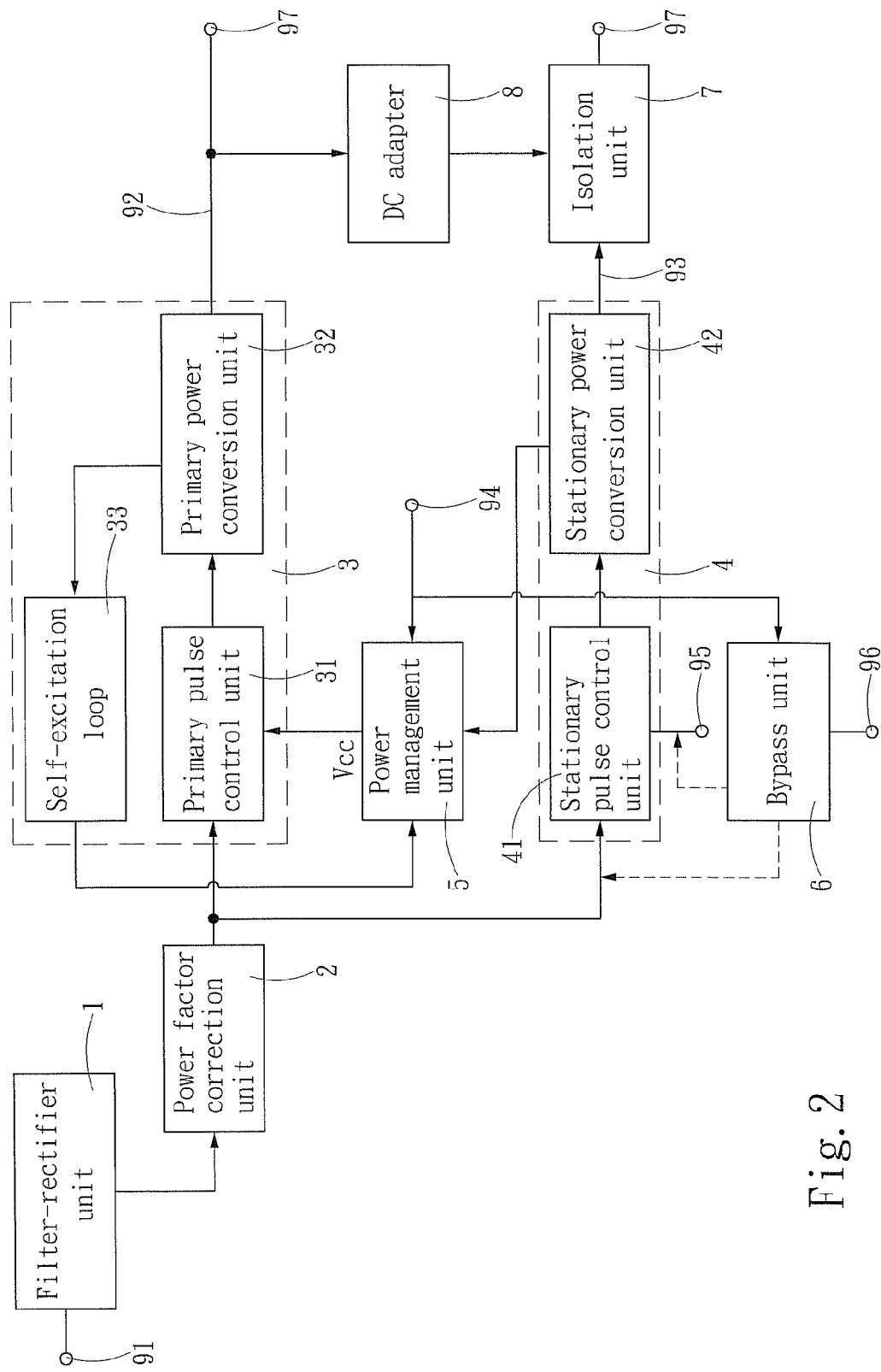
FIG. 2 is a circuit block diagram of the present invention.
Figure 3:
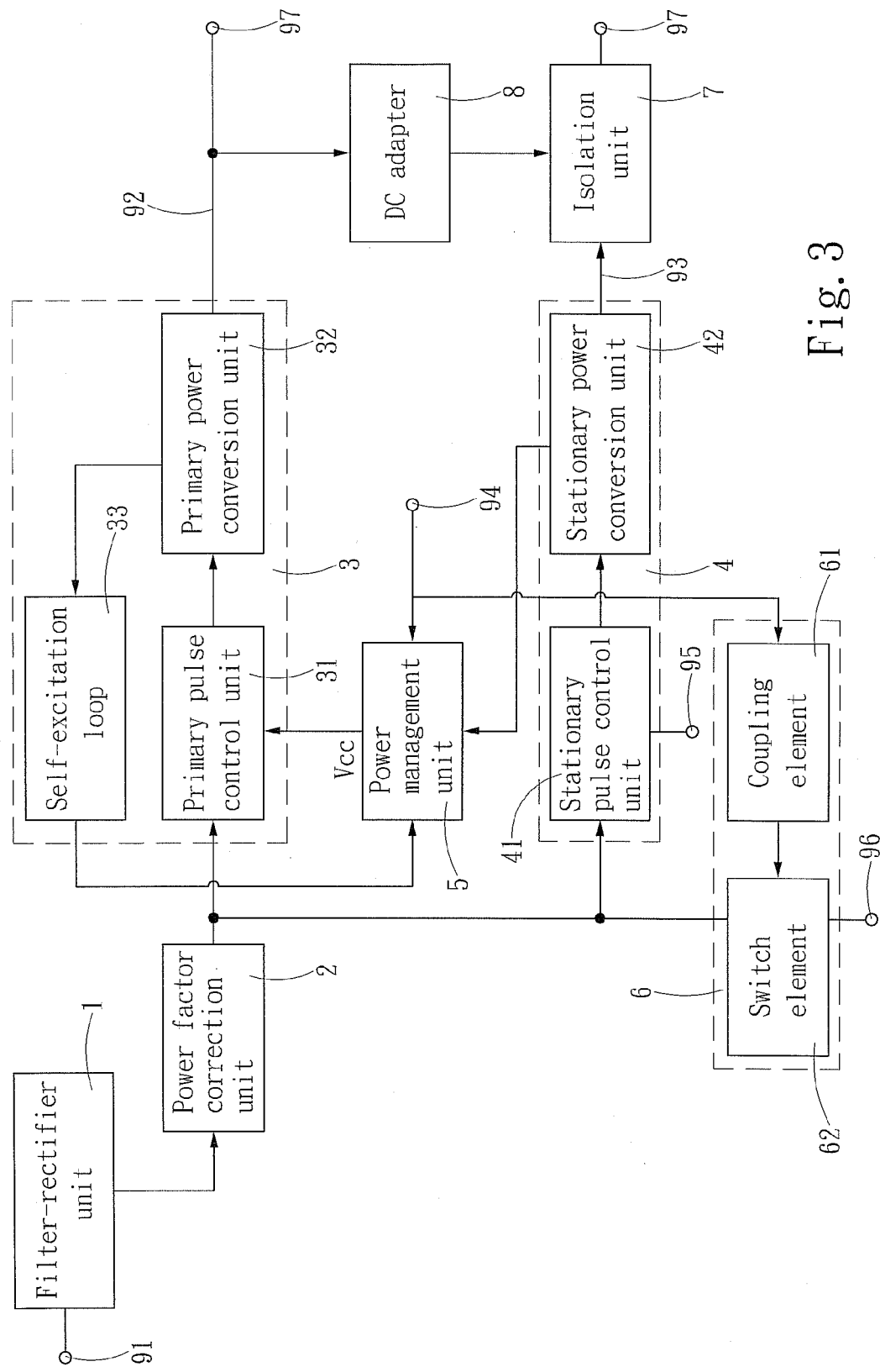
FIG. 3 is a circuit block diagram of a preferred embodiment of the present invention.

With reference to FIG. 2, the present invention provides a system switch circuit applied in a power supply device comprising a primary power system 3, a stationary power system 4 and a power management unit 5. The primary power system 3 includes a primary pulse control unit 31 and a primary power conversion unit 32. The stationary power system 4 also includes a stationary pulse control unit 41 and a stationary power conversion unit 42. The power supply device is provided for obtaining an input power 91, and the stationary pulse control unit 41 of the stationary power system 4 is provided for obtaining a reference frequency signal 95, and driving the stationary power conversion unit 42 to convert the input power 91 according to the reference frequency, and supply a stationary power 93 to an output terminal 97. In the meantime, the stationary power conversion unit 42 generates a first standby signal to turn on the power management unit 5, and the power supply device enters into a standby mode. If the stationary power system 4 has outputted the first standby signal to turn on the power management unit 5, a remote ON/OFF signal 94 is generated to trigger the power management unit 5 to output a bias voltage power, and the primary power system 3 is driven by the bias voltage power to convert the input power 91 into a primary output power 92 to be supplied to another output terminal 97. After the power management unit 5 outputs the bias voltage power, the remote ON/OFF signal 94 is generated to trigger and stop generating the bias voltage power; so as to turn off the primary power system 3. The power supply device further installs a system switch circuit, wherein the system switch circuit is triggered by the remote ON/OFF signal 94 to interrupt the stationary power system 4 from obtaining an electric power path of the input power 91 and the reference frequency signal 95 to interrupt the stationary power 93, and the remote ON/OFF signal 94 is triggered again to conduct the stationary power system 4 to obtain the electric power path of the input power 91 or the reference frequency signal 95 and generate the stationary power 93. The system switch circuit includes a bypass unit 6 and a discharge terminal 96 connected to the bypass unit 6, and the bypass unit 6 is connected to the stationary power system 4 for obtaining the electric power path of the input power 91 or the reference frequency signal 95, and the remote ON/OFF signal 94 is triggered to conduct the input power 91 or the reference frequency signal 95 to the discharge terminal 96. After the stationary power conversion unit 42 of the stationary power system 4 has outputted the first standby signal to turn on the power management unit 5, the remote ON/OFF signal 94 is generated to trigger the power management unit 5 to output the bias voltage power. If the primary power system 3 is driven by the bias voltage power for the operation, the bypass unit 6 will be triggered by the remote ON/OFF signal 94 to conduct the input power 91 or the reference frequency signal 95 to the discharge terminal 96, such that the stationary power system 4 is turned off, and the power management unit 5 is triggered by the remote ON/OFF signal 94 to turn off the primary power system 3. In the meantime, the bypass unit 6 is triggered by the remote ON/OFF signal 94 to conduct the stationary power system 4 to obtain the electric power path of the input power 91 or the reference frequency signal 95 to turn on the stationary power system 4, so as to achieve the effect of selectively turning on and off the primary power system 3 and the stationary power system 4 to prevent an additional power loss caused by the simultaneous operation of the primary and stationary power systems 3, 4. In FIG. 3, the bypass unit 6 includes a coupling element 61 and a switch element 62, and the coupling element 61 can be an optical coupler, wherein a terminal of the switch element 62 is connected to the discharge terminal 96, and another terminal of the switch element 62 is connected to the stationary power system 4 to obtain the electric power path of the input power 91 or the reference frequency signal 95. After the coupling element 61 obtains the remote ON/OFF signal 94, the bypass signal is generated to trigger and conduct both terminals of the switch element 62 to interrupt the stationary power system 4 from obtaining the electric power path of the input power 91 or the reference frequency signal 95.

Figure 4:
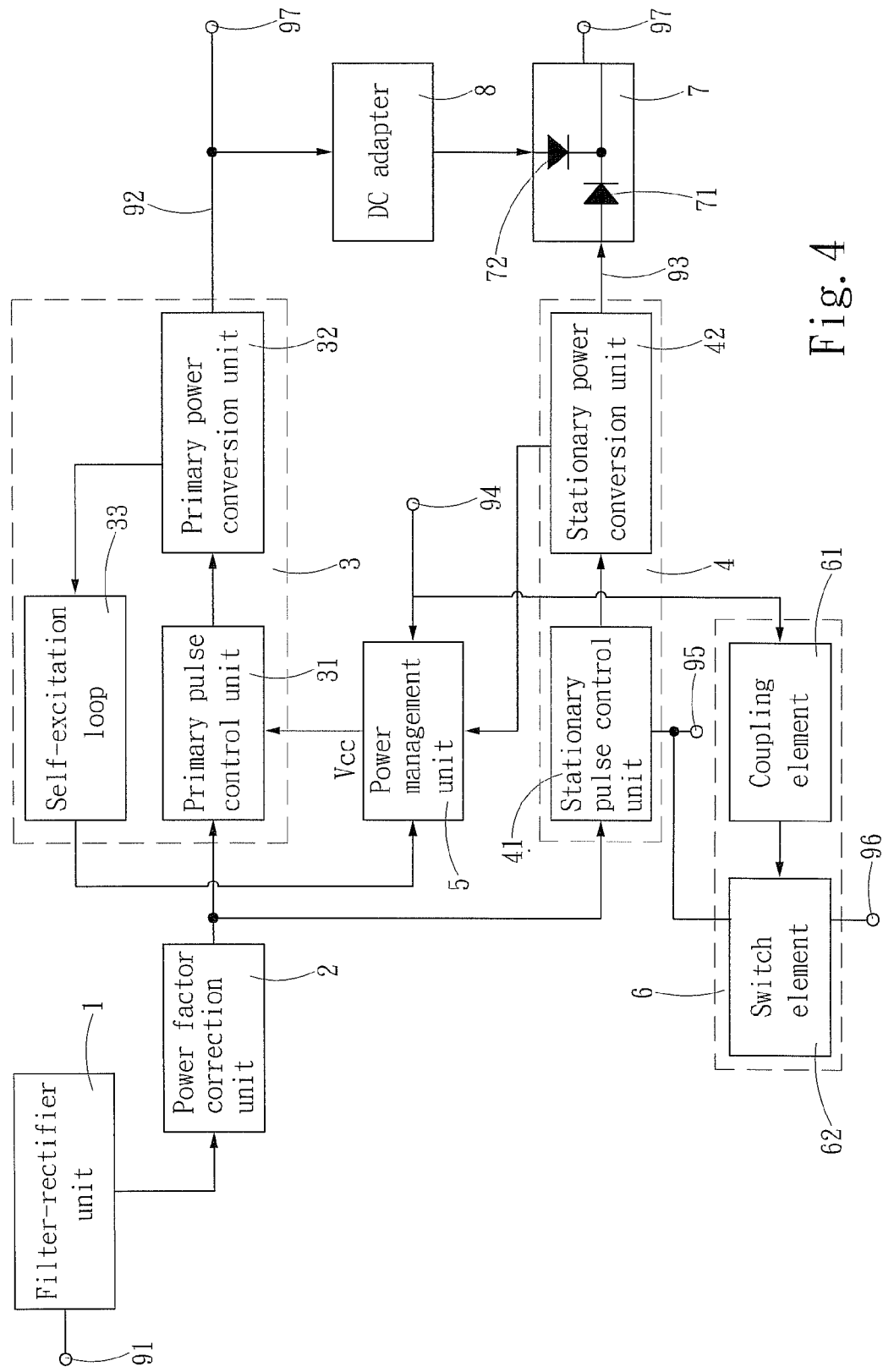
FIG. 4 is a schematic view of another preferred embodiment of the present invention.

With reference to FIG. 2 again, the aforementioned structure can provide an effect of selectively turning on the primary power system 3 and the stationary power system 4. The system switch circuit further includes an isolation unit 7, and the stationary power system 4 outputs the stationary power 93 to the isolation unit 7, and the isolation unit 7 further obtains the primary output power 92 and determines a conducted path according to a voltage difference between the stationary power 93 and the primary output power 92. A DC adapter 8 is installed between the primary power system 3 and the isolation unit 7, such that when the stationary power system 4 is turned off, the isolation unit 7 conducts the primary power system 3 through the DC adapter 8 to output electric power. Before the primary power system 3 is turned on, the isolation unit 7 conducts a stationary power 93 supplied by the stationary power system 4. With reference to FIG. 4, the isolation unit 7 comprises two diodes 71, 72, wherein anodes of the two diodes 71, 72 are connected to the primary output power 92 and the stationary power 93 respectively and cathodes of the two diodes 71, 72 are connected in parallel with each other. The voltage difference of the two diodes 71, 72 determines the conduction of which one of the diodes 71, 72 to supply the stationary power 93. The primary power system 3 further includes a self-excitation loop 33 connected to the primary power conversion unit 32. If the stationary power system 4 is turned off temporarily, the self-excitation loop 33 is excited by the output of the primary power system 3 to generate a second standby signal to the power management unit 5 to substitute the first standby signal, so that the power management unit 5 can continue its operation.

With the aforementioned circuit architecture, the stationary power system 4 is turned off after the primary power system 3 is turned on, and the stationary power system 4 resumes the standby mode after the primary power system 3 is turned off. By switching the operation between the primary power system 3 and the stationary power system 4, the present invention can save the power loss of the stationary power system 4.

In summation of the description above, the present invention improves over the prior art and complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A power supply device with a system switch circuit, and the power supply device comprising:
a stationary power system, for producing a first standby signal and generating a stationary power after the stationary power system obtains an input power and a reference frequency signal;
a power management unit, triggered by a remote ON/OFF signal for outputting a bias voltage power after the power management unit obtains the first standby signal;
a primary power system, driven by the bias voltage power to convert the input power into a primary output power;
a system switch circuit, triggered by the remote ON/OFF signal to interrupt the stationary power system from obtaining an electric power path of the input power or the reference frequency signal for the stationary power, and triggered by the remote ON/OFF signal again to conduct the stationary power system for obtaining the electric power path of the input power or the reference frequency signal to generate the stationary power.

2. The power supply device with a system switch circuit of claim 1, wherein the system switch circuit includes a bypass unit and a discharge terminal, and the bypass unit is coupled to the stationary power system for obtaining the electric power path of the input power or the reference frequency signal, and triggered by the remote ON/OFF signal to conduct the input power or the reference frequency signal with the discharge terminal to turn off the stationary power system.

3. The power supply device with a system switch circuit of claim 2, wherein the bypass unit includes a coupling element and a switch element, and a terminal of the switch element is coupled to the discharge terminal, and another terminal of the switch element is coupled to the stationary power system for obtaining the electric power of the input power or the reference frequency signal, and after the coupling element obtains the remote ON/OFF signal, a bypass signal is generated to trigger and conduct both terminals of the switch element to interrupt the stationary power system from obtaining the electric power path of the input power or the reference frequency signal.

4. The power supply device with a system switch circuit of claim 3, wherein the coupling element is an optical coupler.

5. The power supply device with a system switch circuit of claim 2, wherein the system switch circuit further includes an isolation unit, and a stationary power is outputted by the stationary power system through the isolation unit, and the isolation unit further obtains the primary output power and determines a conducted electric power path according to the voltage difference between the stationary power and the primary output power.

6. The power supply device with a system switch circuit of claim 2, wherein the isolation unit comprises two diodes, and anodes of the two diodes are coupled to the primary power system and the stationary power system respectively, and cathodes of the two diodes are coupled in parallel with each other, for determining which one of the diodes to be connected according to a voltage difference between the primary output power and the stationary power.

7. The power supply device with a system switch circuit of claim 6, further comprising a DC adapter installed between the primary power system and the isolation unit.

8. The power supply device with a system switch circuit of claim 1, wherein the primary power system is coupled to a self-excitation loop, and excited by an output of the primary power system to generate a second standby signal to be sent to the power management unit.

9. The power supply device with a system switch circuit of claim 1, wherein after the bias voltage power is outputted, the power management is triggered by the remote ON/OFF signal to stop generating the bias voltage power.

* * * * *